United States Patent [19]
Hirsch

[11] Patent Number: 6,126,844
[45] Date of Patent: *Oct. 3, 2000

[54] TAPERED MONOCAPILLARY-OPTICS FOR POINT SOURCE APPLICATIONS

[76] Inventor: Gregory Hirsch, 1277 Linda Mar Center, Suite 128, Pacifica, Calif. 94044

[ * ] Notice: This patent is subject to a terminal disclaimer.

[21] Appl. No.: 09/195,275

[22] Filed: Nov. 18, 1998

[51] Int. Cl.$^7$ .................................................. C03C 25/06
[52] U.S. Cl. ................. 216/11; 216/24; 216/56; 216/84; 216/85; 216/92; 156/345 L; 156/345 LC
[58] Field of Search .................................. 216/11, 24, 56, 216/84, 85, 92; 156/345; 427/163.5, 534; 65/31, 387, 42 A

[56] References Cited

U.S. PATENT DOCUMENTS 5,772,903  6/1998  Hirsch ........................................ 216/11

*Primary Examiner*—Deborah Jones
*Assistant Examiner*—Lymarie Miranda
*Attorney, Agent, or Firm*—Townsend and Townsend and Crew LLP

[57] ABSTRACT

A glass or metal wire is precisely etched to form the paraboloidal or ellipsoidal shape of the final desired capillary optic. This shape is created by carefully controlling the withdrawal speed of the wire from an etchant bath. In the case of a complete ellipsoidal capillary, the etching operation is performed twice in opposite directions on adjacent wire segments. The etched wire undergoes a subsequent operation to create an extremely smooth surface. This surface is coated with a layer of material which is selected to maximize the reflectivity of the radiation. This reflective surface may be a single layer for wideband reflectivity, or a multilayer coating for optimizing the reflectivity in a narrower wavelength interval. The coated wire is built up with a reinforcing layer, typically by a plating operation. The initial wire is removed by either an etching procedure or mechanical force. Prior to removing the wire, the capillary is typically bonded to a support substrate. One option for attaching the wire to the substrate produces a monolithic structure by essentially burying it under a layer of plating which covers both the wire and the substrate. The capillary optic is used for efficiently collecting and redirecting the divergent radiation from a source which could be the anode of an x-ray tube, a plasma source, the fluorescent radiation from an electron microprobe, or some other source of radiation.

18 Claims, 7 Drawing Sheets

TAPERED MONOCAPILLARY-OPTICS FOR POINT SOURCE APPLICATIONS

STATEMENT AS TO RIGHTS TO INVENTIONS MADE UNDER FEDERALLY SPONSORED RESEARCH AND DEVELOPMENT

This invention was made with Government support under Grant No. DE-FG03-96ER82185 awarded by the Department of Energy. The Government has certain rights in this invention.

FIELD OF THE INVENTION

This invention relates to the use of optics to produce a directed beam of radiation by grazing-incidence reflection. More particularly, a tapered monocapillary optic generated by specific fabrication methods and having an ellipsoidal or paraboloidal taper profile is used to collect divergent radiation from a quasi point source, and redirect the radiation into either a collimated beam or a focused distant spot. X-rays generated by electron impact on a small volume are one such source of particular interest. The capillary's reflective interior bore may use a single layer of material for wideband reflectance, or a multilayer coating for enhanced reflectivity in a narrower bandwidth.

This Application provides continuing disclosure from U.S. Pat. No. 5,772,903 issued Jun. 30, 1998. In that applica-tion, we disclosed a manufacturing technique to produce tapered capillary optics possessing the desired taper figure on demand. In this application, we specifically discuss the production and usage of capillaries having ellipsoidal or paraboloidal taper shapes. In this application, we make the point that the same technique can be used to generate ellipsoids, paraboliods, and other shapes of curves. Naturally, the disclosure of U.S. Pat. No. 5,772,903 is incorporated herein by reference as if set forth in full.

BACKGROUND OF THE INVENTION

The introduction of x-ray analysis has been one of the most significant developments in twentieth-century science and technology. The use of x-ray diffraction, spectroscopy, imaging, and other techniques has led to a profound increase in our knowledge in virtually all scientific fields. The capabilities of x-ray analysis have expanded consistently with the availability of ever more powerful sources of radiation. The standard x-ray tube has seen a relatively gradual increase in performance over many decades. Notable improvements in x-ray tube technology include the introduction of rotating anode sources and microfocus tubes. The advent of synchrotron radiation sources over the past few decades has led to a true revolution in x-ray science. Although the use of synchrotron radiation has become an extremely important research tool, the need to travel to large and extremely expensive central facilities to perform experiments during a limited time interval is a distinct disadvantage. Thus, the vast majority of work is still performed using x-ray tubes.

Many experiments are now performed using rotating anode sources which have significantly higher power capabilities than stationary anode tubes. These sources are quite expensive and can consume over ten kilowatts of input power. Recently, with the introduction of improved x-ray focusing optics, the ability to use small, low power microfocus x-ray sources to achieve x-ray beam intensities comparable to that achieved with rotating anode tubes has been demonstrated. It has been shown that a microfocus source running at a few tens of watts input power, in conjunction with focusing optics, can produce beams with a brightness comparable to a multi-kilowatt rotating anode source. Such combined small sources and collection optics will greatly expand the capabilities of x-ray analysis equipment in small laboratories. The optimization of x-ray optics for these applications is of crucial importance for realizing the potential of these laboratory instruments.

PRIOR ART

Although there exist x-ray optics which utilize diffraction for their operation, we are concerned with reflective optics in this invention. It is well known that x-rays incident on a surface at sufficiently small angles of incidence will be reflected by total external reflection. The largest angle of incidence for reflection (critical angle) is determined by the refractive index of the material:

$$n=1-\delta-i\beta$$

Using Snell's Law, we can derive this angle as:

$$\Theta_c=(2\delta)^{1/2} \text{(assuming } \beta=0\text{)}$$

The theoretical value for d is:

$$\delta=\tfrac{1}{2}(e^2/mc^2)(N_{0\rho}/A)Z\lambda^2=2.70\times10^{10}(Z/A)\rho\lambda^2$$

The angles are quite small since the refractive index for x-rays is very close to unity for all materials. For example, the critical angle for borosilicate glass at $1=1$ Å is less than 3 milliradians. For achieving the highest critical angles, high density materials such as gold or platinum are desirable.

Reflective x-ray optics can be classified into several different categories. One class of optics uses grazing incidence reflection from extended mirror surfaces. The most common mirror arrangements have an ellipsoidal or toroidal surface figure for two dimensional focusing of radiation. Another common geometry uses two spherical mirrors oriented sequentially in the vertical and horizontal planes in an arrangement known as a Kirkpatrick-Baez configuration. An absolute requirement for all reflective x-ray optics is the need to have exceedingly smooth reflecting surfaces due to the small wavelength of the radiation. In general, the surface roughness should be better than 1 nanometer rms.

A different approach for reflective x-ray optics uses the ability of fine glass capillaries to act as reflective guide tubes for x-rays, in a similar manner to fiber optics. Several different configurations of these capillary optics exist. One type of optic, sometimes known as a "Khomakhov Lens" uses a number of discreet curved glass-capillary tubes which are precisely mounted in a frame which independently holds each capillary's curved position along the device. In some optics, each carefully positioned capillary fiber is actually a bundle of many much smaller capillary tubes. X-rays are guided through each capillary by multiple reflections along the outer arc of the capillary tube's interior surface. With such optics, the divergent radiation from an x-ray tube's focal spot can be bent into either a collimated beam, or condensed back to a small spot a significant distance from the source. This type of optic is not capable of producing spots smaller than approximately 500 micron.

A different type of multicapillary optic uses a single monolithic multicapillary bundle which is drawn at elevated temperature so as to have a taper on one or both ends. Unlike the multifiber optic, the individual glass channels do not have a constant diameter along their length. This type of optic functions in a similar manner to the multifiber type of optic, but has certain properties which are advantageous in some applications. The smallest spot sizes achievable with this type of optic are approximately 20 microns or larger, while quasi-parallel beam sizes are generally several mm in diameter. Both types of multicapillary optics possess the very attractive ability to collect a large solid angle of radiation emitted from the source, and redirect it. Their main disadvantage is their relatively high cost, and their inability to form very small focused or collimated beams.

In addition to the previously described capillary optics having multiple channels, a single tapered-capillary may be used effectively to collimate or focus radiation. This tapered monocapillary optic has achieved the smallest spot sizes of any type of x-ray optical device. Their most dramatic use has been with synchrotron radiation where the almost parallel input beam can be condensed to sizes well below 1 micron (0.05 microns has been achieved). It is worth noting that tapered monocapillary optics can function in two different focusing modes. In one case, the capillary acts as a true focusing element, with each photon undergoing a single bounce. In this case, a focal spot is produced some distance beyond the capillary exit. In a different type of capillary optic, photons undergo multiple bounces on their way to the exit and the smallest beam diameter is found directly at the exit aperture. This type of optic is often referred to as a capillary condenser, to draw the distinction from a true lens. The smallest beams have been produced by the condenser type optics, although the small working distance from the exit aperture can be a disadvantage.

This invention relates specifically to the use of tapered monocapillary optics. This type of optic is usually produced by heating and drawing a length of glass capillary tubing to a smaller diameter. There has been some progress in forming glass capillaries with paraboloidal or ellipsoidal shapes, but the slope errors and straightness of the capillary figures have been difficult to reliably reproduce. It has also not been feasible to coat the inside of very small capillaries with a different material to enhance the reflectivity. In addition to the standard monocapillary optics produced by this method, a different method has been devised to produce metal reflective tubes by a replicating process on a removable mandrel. The optics produced by these replication methods fall into a category somewhere between standard reflecting optics and true capillary optics due to their larger bore size. The smallest dimensions of their bores are generally near 0.5–1 mm.

U.S. Pat. No. 5,772,903 (1998) entitled TAPERED CAPILLARY OPTICS describes a different technique to produce tapered monocapillary optics having significant advantages over the tapered glass capillaries. That patent describes a method to produce a capillary structure having a well controlled taper profile, a high degree of straightness, an extremely smooth internal reflecting surface, and wide latitude in the selection of materials for the internal bore. The extremely small dimensions (<1 micron) achievable by the methods delineated in that patent are unique for non-glass capillaries.

U.S. Pat. No. 5,772,903 described in detail the manufacturing methods for creating tapered capillary optics which are optimized in their shape and materials of construction. The invention which we are disclosing here further advances these optics with an accent on their use with point sources of radiation. These improvements are in the areas of capillary shapes, reflective interior films, manufacturing techniques, and the use of these capillaries with specific radiation sources. Although the use of point sources is emphasized in this invention, the advances in capillary fabrication techniques disclosed are also applicable to their use with synchrotron radiation or other sources.

SUMMARY OF THE INVENTION

A glass or metal wire is precisely etched to form the paraboloidal or ellipsoidal shape of the final desired capillary optic. This shape is created by carefully controlling the withdrawal speed of the wire from an etchant bath. In the case of a complete ellipsoidal capillary, the etching operation is performed twice in opposite directions on adjacent wire segments. The etched wire undergoes a subsequent operation to create an extremely smooth surface. This surface is coated with a layer of material which is selected to maximize the reflectivity of the radiation. This reflective surface may be a single layer for wideband reflectivity, or a multilayer coating for optimizing the reflectivity in a narrower wavelength interval. The coated wire is built up with a reinforcing layer, typically by a plating operation. The initial wire is removed by either an etching procedure or mechanical force. Prior to removing the wire, the capillary is typically bonded to a support substrate. One option for attaching the wire to the substrate produces a monolithic structure by essentially burying it under a layer of plating which covers both the wire and the substrate. The capillary optic is used for efficiently collecting and redirecting the divergent radiation from a source which could be the anode of an x-ray tube, a plasma source, the fluorescent radiation from an electron microprobe, or some other source of radiation.

DESCRIPTION OF THE SPECIFIC EMBODIMENTS

U.S. Pat. No. 5,772,903 previously described a fabrication technique for creating tapered monocapillary optics. That patent disclosed a method for creating capillaries with the desired taper profiles on demand, including paraboloidal and ellipsoidal figures. The basic capillary formation process described in that patent is the following: A metal or glass wire is etched with great precision to have a taper with the shape of the desired final capillary-optics bore. By controlling the rate of removal of the wire from an etchant bath, the precisely controlled taper is produced. The wire velocity can be regulated using a closed-loop control system which uses a sensor to measure the wire diameter or slope of the wire as it leaves the etchant for feedback control. The etched wire undergoes a treatment to produce an extremely low surface roughness. This can be a thermal treatment process, or alternately, coating the wire with a material that has an extremely smooth surface and covers the surface roughness of the as-etched wire. Certain such materials can be applied in a molten state, or alternately as a lacquer by dissolving the material in a solvent which evaporates. The etched and smoothed wire is coated with the material of choice for optimizing the reflectivity of the radiation being used. This is typically a vacuum deposition process such as sputtering. The coated wire is built up with a material to make it more robust, typically with electroplating or electroless deposition. The wire is vertically oriented and tensioned to be straight during this process. In one embodiment, the wire is removed from the built up structure by heating the assembly to liquefy the smoothing layer and physically pulling it out. In a different embodiment, the wire is dissolved away chemically to leave the final hollow internal bore of the final tapered capillary optical element. When removing the wire chemically, it is generally necessary to open a number of slots along the capillary structure to allow the removal of the wire in a reasonable time period. Since the wire functions as a mandrel for subsequent forming operations, we will henceforth refer to it as the "mandrel wire". The capillary is typically mounted to a rigid substrate prior to the removal of the wire.

Figure 1:
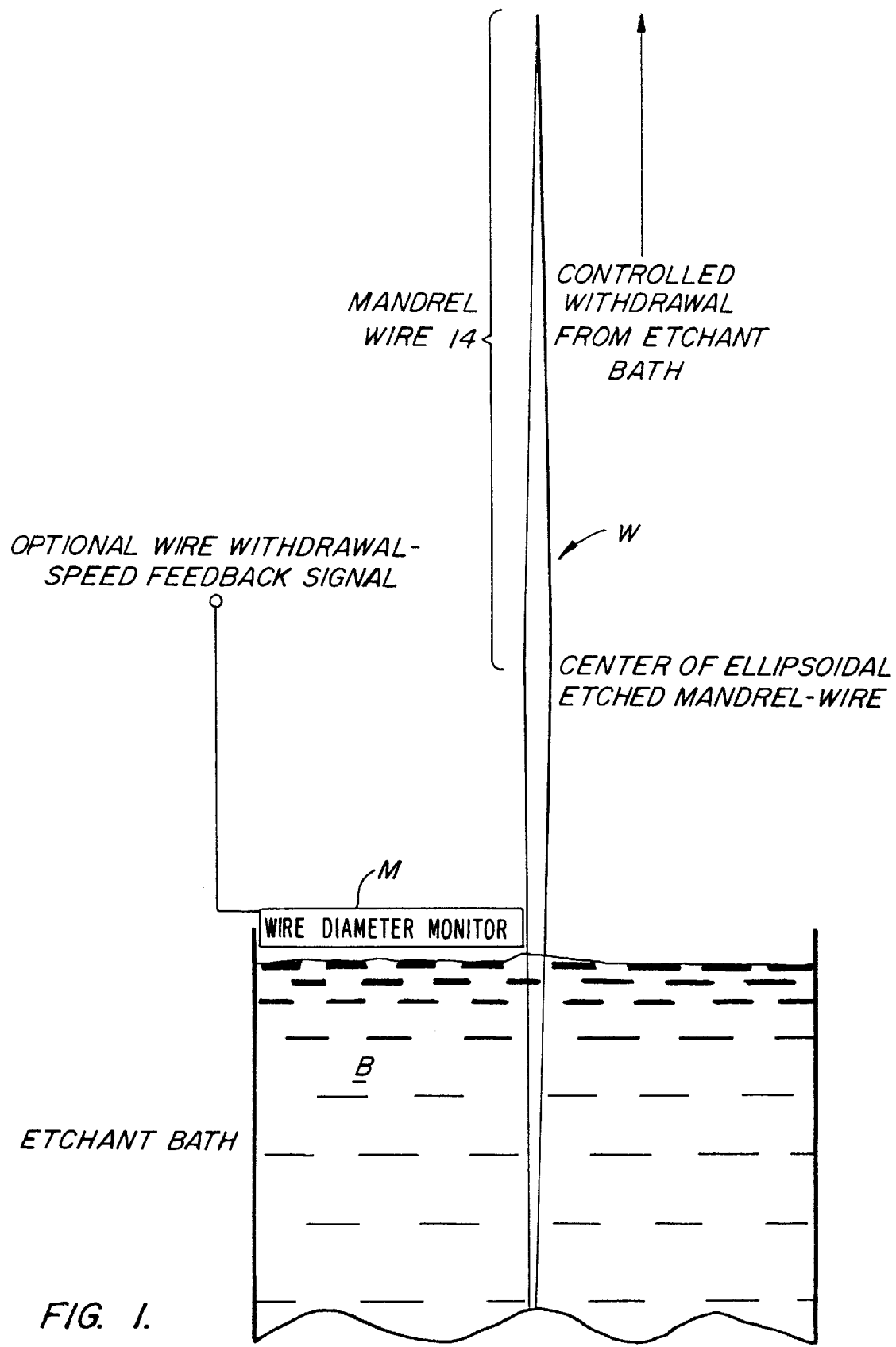
FIG. 1 illustrates a mandrel wire being etched into a full ellipsoidal shape.
Figure 2:
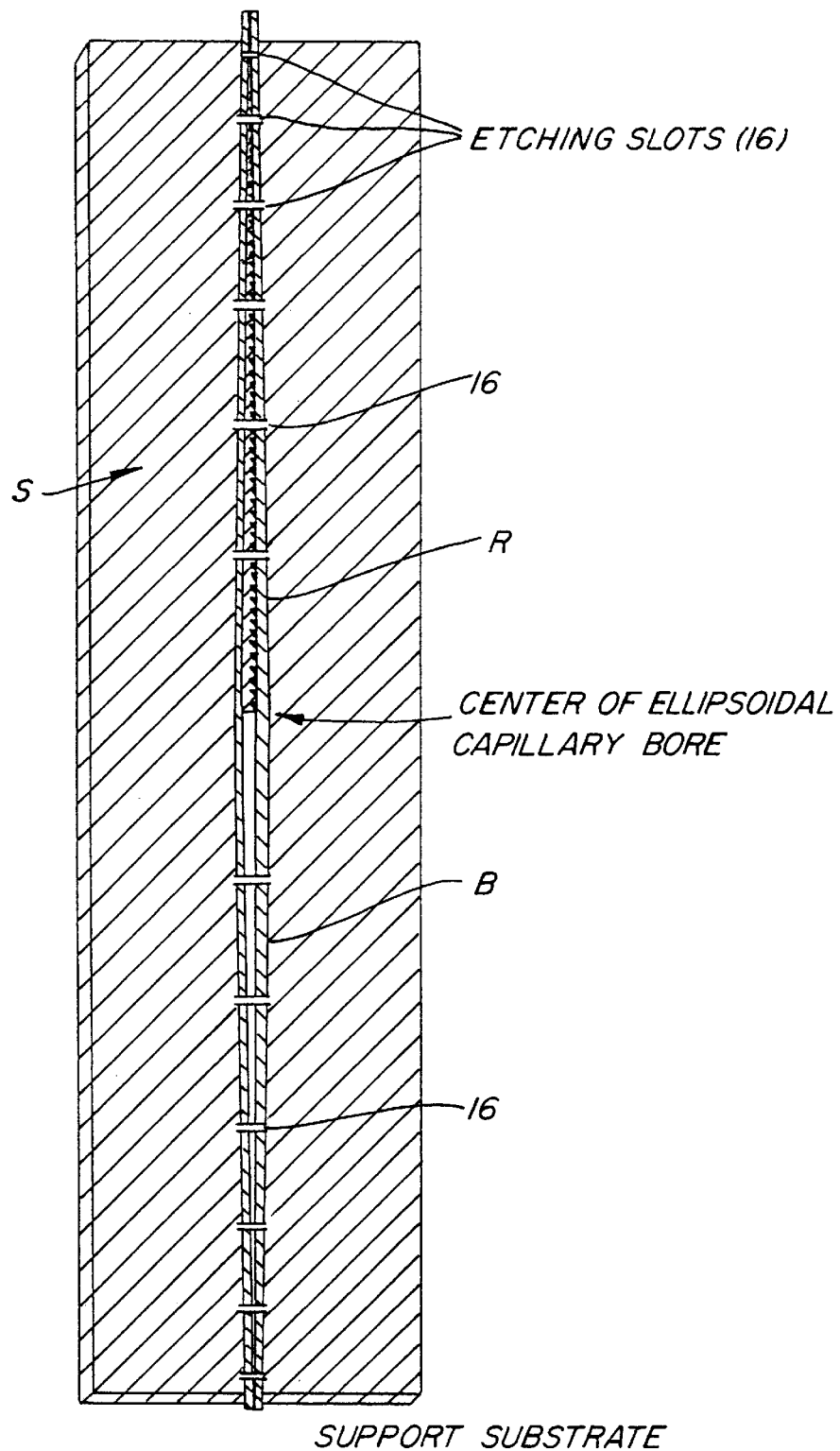
FIG. 2 illustrates an ellipsoidal capillary cavity formed by etching away the mandrel wire.

U.S. Pat. No. 5,772,903 did not describe the generation of capillaries having full or nearly full ellipsoidal cavities, since the mandrel-wire diameter always decreases as it is removed from the etchant bath. Referring to FIG. 1, a method is illustrated which permits the production of etched mandrel wires having ellipsoidal shapes and a maximum diameter which does not coincide with the capillary opening. In this embodiment, metal wire W has first half ellipsoid 14 first formed on the wire, as described by the referenced patent. The wire is then inverted, the etched section of wire is attached to the withdrawal mechanism, and wire W is again lowered into etchant bath B far enough to submerge all of the unetched wire, but no part the etched section. The etching process is then repeated with monitoring at monitor M to form the complete ellipsoidal shape. The completed capillary is produced as before. Of course, it is necessary to use chemical dissolution of the wire to form the capillary interior cavity as it is not possible to physically pull the wire out of the structure with this geometry. Referring to FIG. 2, metal wire W is fastened to supporting substrate S, coated with reflective material R, and slotted at intermittent slots 16. Once sloting has occurred, the wire is conventionally etched away with the result that complete ellipsoidal capillary focusing element E is formed. Ellipsoidal capillary focusing element E is shown after etching attached to supporting substrate S with formed internal reflective bore B.

The reader will appreciate that just as an ellipsoidal bore can be etched, so can a paraboloidal bore. Since these respective tapers are gradual and not detectable other than by careful precision measurement, they are schematically represented herein as a linear tapered construction.

It has been found that the etching rate of the wire material is often reproducible enough to etch the wire in an open-loop system, and one can dispense with the need for feedback control. In this type of system, the expected velocity sequence is calculated from a measurement of the linear etching rate of the wire material. It is convenient to have a computer calculate the expected velocity program and load this data into the motion controller. If there is any non-linearity of the etching rate versus diameter, this can be experimentally measured and corrected for in the program.

An especially good way to open up a series of etching grooves for subsequent chemical dissolution is to use a wire saw. One type of wire saw uses a diamond impregnated wire which is much cleaner than using a slurry for the cutting. This type of saw generates negligible distortion to the capillary structure. It is also possible to only cut partially into the mandrel-wire so as to leave most of the capillary bore intact, even at the location of the cut.

An alternate method for creating a nearly full ellipsoidal capillary is to produce two half-ellipsoidal capillaries, and mount them with their large openings adjoined, or in close proximity. It is also possible to accomplish a point-to-point focusing arrangement by using two adjoined paraboloidal capillaries. Neither of these options is as desirable as a single monolithic ellipsoidal capillary.

For maximizing the performance level of a capillary optic, the material comprising the bore of the capillary should be selected to have the highest reflectivity and the highest critical angle. These two aims are sometimes in conflict as the highest critical angle materials are high density materials which are generally not as reflective as the lower density materials which have lower critical angles. For a one-bounce type of optic, the increase in critical angle of a high density material will, in general, more than offset its lower reflectivity. For multiple-bounce optics, this may not be the case. A full analysis needs to be performed on each particular capillary shape and energy range. All of the preceding assumes a single layer of reflecting film on the capillary bore. There is a different type of reflecting layer which is a multilayer coating. This is a layer of generally two different materials: a high-Z scattering layer, and a low-Z spacer. These materials function as large d-spacing synthetic crystals which reflect according to Bragg's Law. From Bragg's Law, a strong reflection occurs when the following condition occurs:

$$\lambda = 2d \sin \Theta$$

Figure 3:
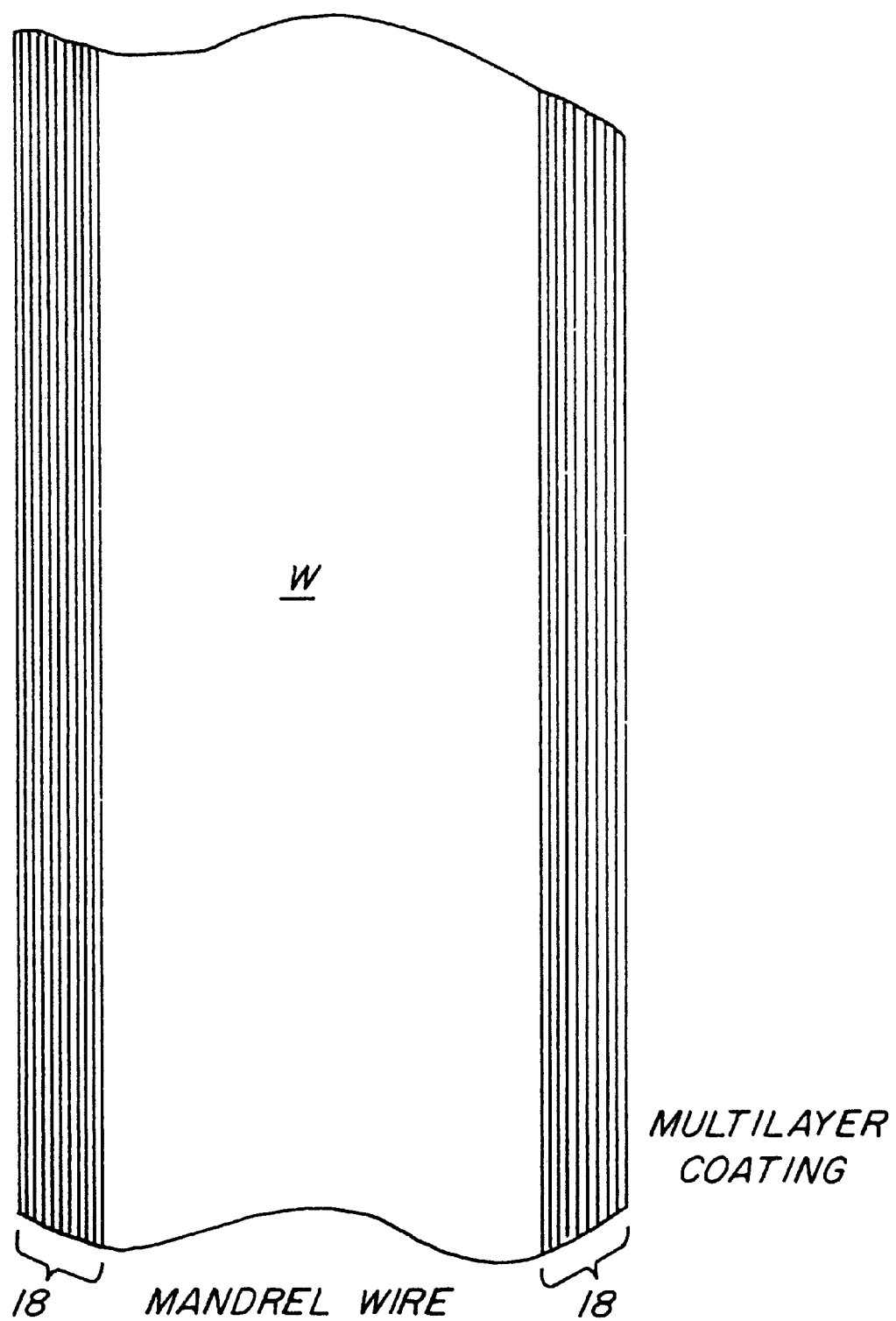
FIG. 3 illustrates a mandrel wire with a multilayer coating prior to being built up by plating.

Referring to FIG. 3, mandrel wire W is shown with a multilayer coating 18. This coating is applied by vacuum deposition from two sources. Since the angle of incidence for radiation is not constant for a capillary that doesn't have a linear taper, Bragg's Law is not strictly observed for a single wavelength along the whole optic. It is possible to compensate for this by having a multilayer with a varying thickness along the taper so that the d-spacing gets small as the angle of incidence increases. Such structures have been previously prepared in larger optics. Alternately, the band-width of the source, as well as the multilayer bandwidth, is often large enough due the rather small range of incidence angles in these capillaries.

There are two general approaches to reinforcing the capillary structure. In one embodiment a relatively large amount of material is added to the coated wire to form a rigid structure. This piece is often subsequently bonded to a flat substrate to make it even more robust, although this is not absolutely required if the reinforcing material is thick and rigid enough.

Figure 4:
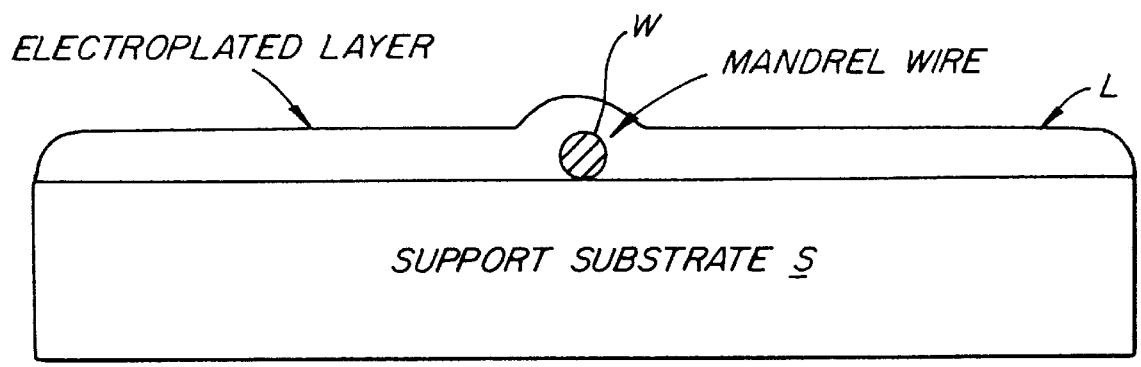
FIG. 4 illustrates a capillary structure formed by electroplating a coated wire onto a supportive substrate.

A different embodiment is shown in FIG. 4. Here the coated wire W is first mounted directly to the supporting substrate S, either in contact at the large end, or held in close proximity directly above the substrate surface. It is desirable to accomplish this step while the wire is tensioned and vertically oriented to keep the wire absolutely straight. A third possibility is to machine the substrate so that it has a surface figure which matches the wire shape. In this case, the wire may lie completely in contact with the surface, but not be curved.

After this mounting step, the wire is then essentially buried on the substrate under an electroplated or electroless deposited layer L on both the wire and the substrate. It is often desirable to perform a small amount of plating on the mandrel wire itself before bonding to the substrate for further plating. The result of this process is a monolithic structure with superior dimensional properties. For high heat load applications, such as synchrotrons, very high thermal conductivity can be realized by using a substrate of copper or silver, followed by plating with the same material.

There are a number of different radiation sources which may be used with these optical elements. U.S. Pat. No. 5,772,903 described x-ray and neutron applications, although there may be other applications for longer wavelength photons. We will discuss here a specific application for these optics using a quasi point-source of x-rays. The most important source is the x-ray tube.

Figure 5:
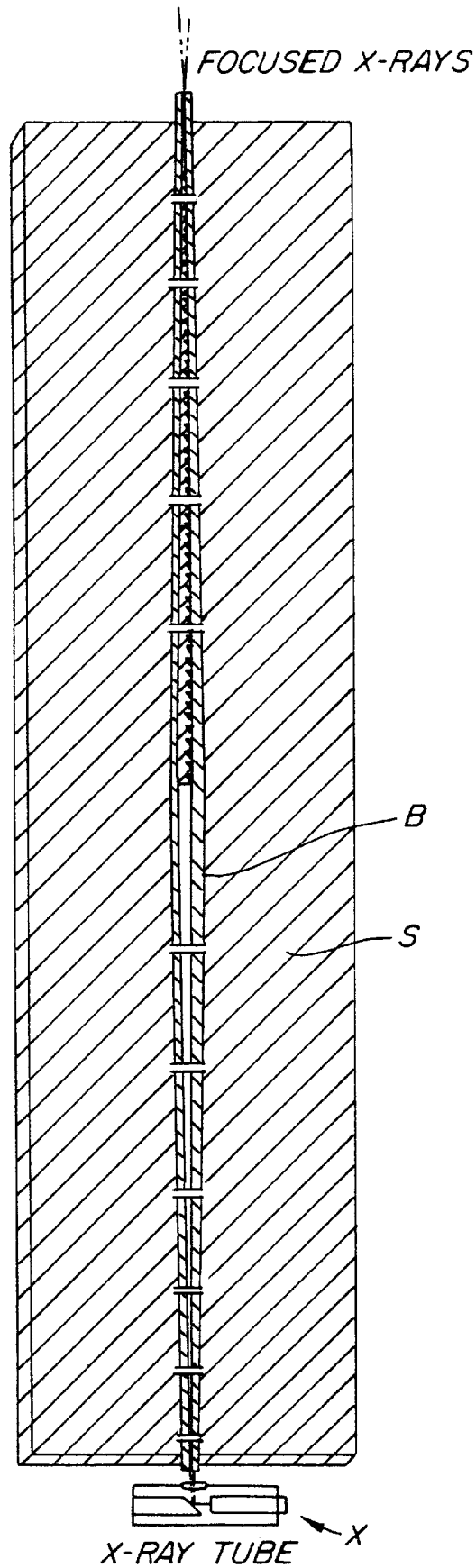
FIG. 5 illustrates an ellipsoidal capillary being used with an x-ray tube source.

Referring to FIG. 5, an ellipsoidal capillary optic is shown being used with x-ray tube X. In this geometry, the source is located at one foci of the ellipse, and an image is formed at the other foci.

Figure 6:
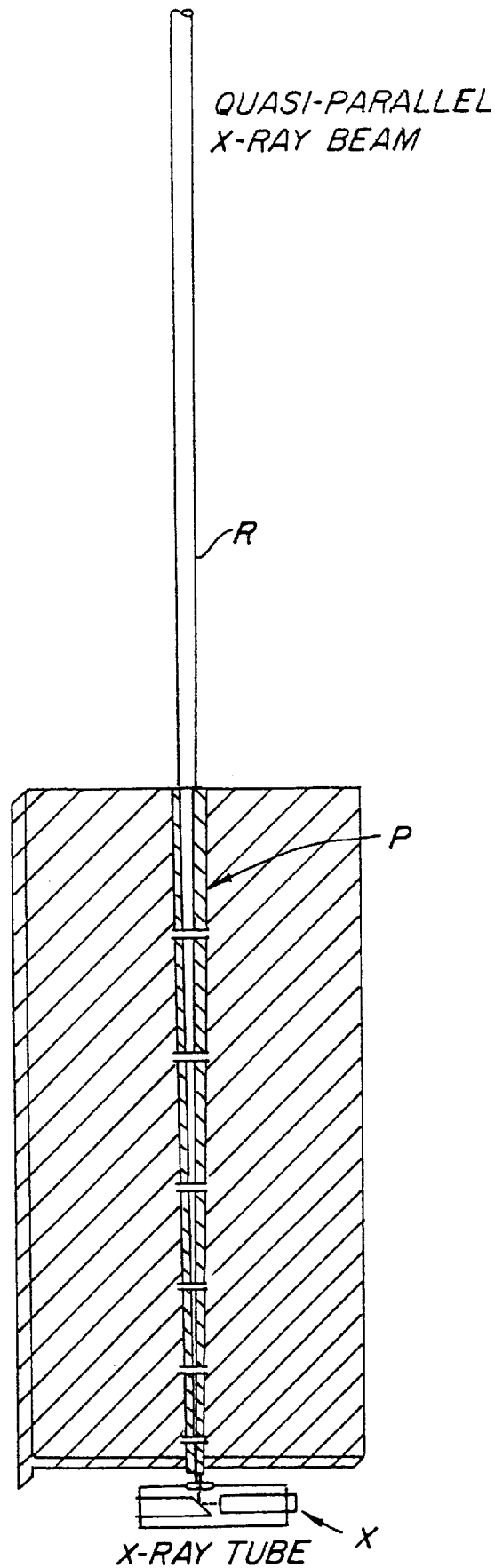
FIG. 6 illustrates a paraboloidal capillary being used with an x-ray tube source.

Referring to FIG. 6, a paraboloidal capillary is shown being used with an x-ray tube. In this geometry, a quasi-parallel beam of radiation is produced by redirecting the divergent radiation emitted from the source. These two source and optics arrangements are very desirable for performing experiments in small laboratories. X-ray fluorescence from a small volumes of material using ellipsoidal capillaries is one important application. X-ray diffraction, using either ellipsoidal or paraboloidal capillaries is another very useful application of this technology.

When selecting an x-ray tube to use with these optics, it is desirable to use the brightest possible source. It is well known that the maximum power loading that an x-ray tube can dissipate is approximately proportional to the spot size. Thus, the brightest x-ray tubes are microfocus sources, since the power per unit area is highest. Of course, the total flux is not as high, but this is not the important parameter for this application. These microfocus sources have the advantage of smaller size, lower power requirements, and lower cost compared to high power rotating anode sources.

Figure 7:
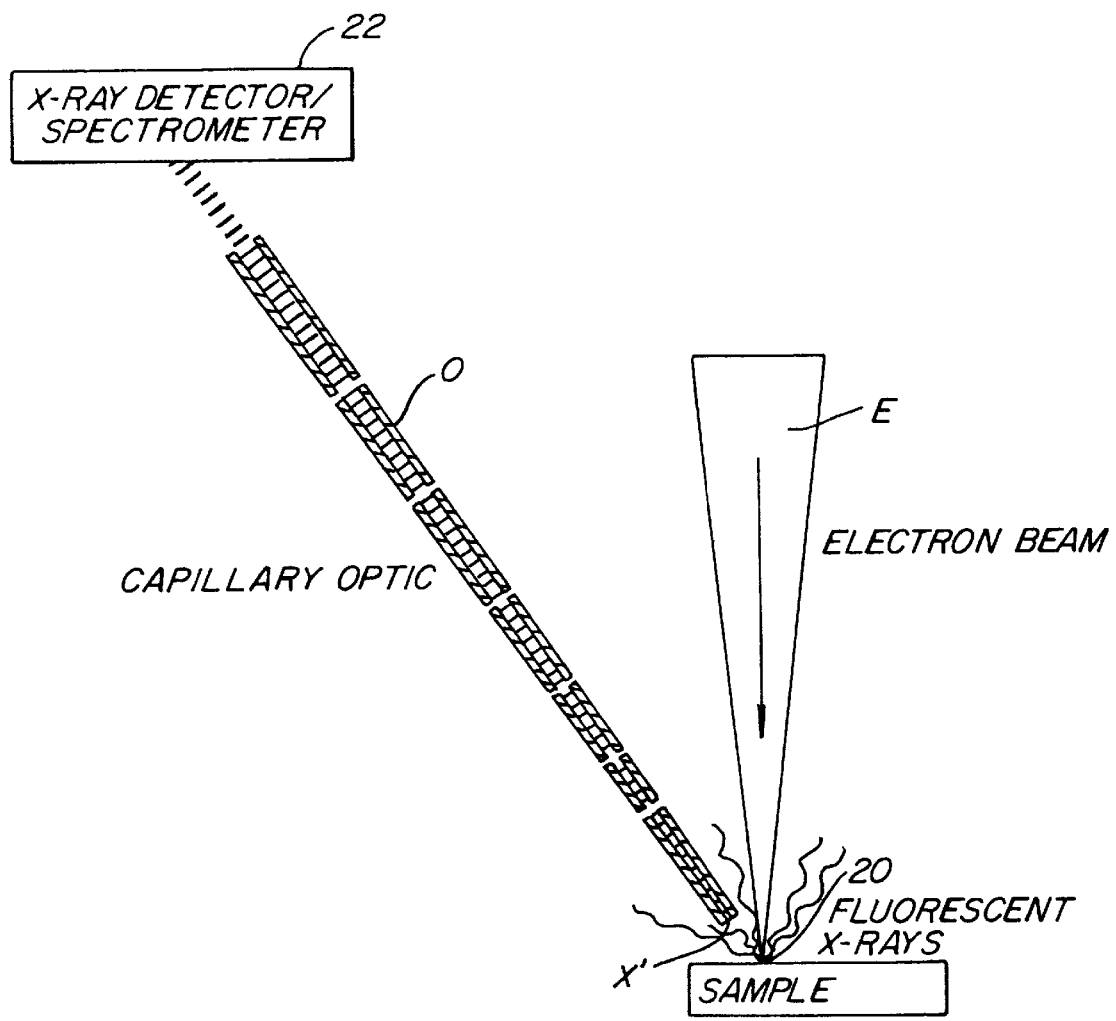
FIG. 7 illustrates a paraboloidal capillary collecting the fluorescent radiation from an electron microprobe spot.

A different application of these optics involves collecting the x-rays emitted from a small volume of material on a specimen in an electron microprobe instrument. This arrangement is fundamentally no different than the use with a microfocus tube. An extremely small electron beam is directed at specific locations on a specimen, and fluorescent x-rays are emitted. This arrangement is often incorporated in a Scanning Electron Microscope(SEM) system. After collecting the fluorescent x-rays, the radiation is directed to a detector which measures the spectral distribution of the radiation for determining the elemental content of the sample. Referring to FIG. 7, fluorescent x-rays emitted from the electron impact point of an electron microprobe apparatus are collected by a capillary optic of the type described in this invention. Depending on the type of detector used, the optic could be paraboloidal or ellipsoidal.

A different type of radiation source generates short wavelength photons by emission from a very hot plasma. There are several different ways to generate the plasma, but the most common type uses a focused laser beam to heat a target material to an extremely high temperatures. The x-rays from the small plasma volume are collected and redirected as before by the capillary optic. One complication for this type of source is the need to keep debris from the expanding plasma from contaminating the optics. A number of methods have been devised for this. This type of source is especially useful for the generation of soft x-rays where electron impact sources are extremely inefficient.

What is claimed is:

1. A process for producing a tapered monocapillary optic having a paraboloidal figure for focusing radiation comprising the steps of:

providing an etchant bath;

providing a wire to be etched by the etchant bath;

placing the wire in the etchant bath to a preselected depth for etching;

withdrawing the wire from the preselected depth at a controlled rate to form a differential etch to form a tapered wire with a desired paraboloidal figure of the tapered monocapillary optic;

coating the tapered wire with a coating reflective of the radiation to be focused by the monocapillary optic to produce a coated wire; and, removing the tapered wire from the reflective coating to leave only a reflective bore having the desired paraboloidal figure for focusing radiation.

2. A process for producing a tapered monocapillary optic having an ellipsoidal figure for focusing radiation comprising the steps of:

providing an etchant bath;

providing a wire to be etched by the etchant bath;

placing the wire in the etchant bath to a preselected depth for etching;

withdrawing the wire from the preselected depth at a controlled rate to form a differential etch to form a tapered wire with a desired ellipsoidal figure of the tapered monocapillary optic;

coating the tapered wire with a coating reflective of the radiation to be focused by the monocapillary optic to produce a coated wire; and, removing the tapered wire from the reflective coating to leave only a reflective bore having the desired ellipsoidal figure for focusing radiation.

3. A process for producing a tapered monocapillary optic used for focusing radiation having a figure tapering from a middle portion to both ends and a having a maximum diameter not coinciding with an open end of the optic comprising the steps of:

providing an etchant bath;

providing a wire to be etched by the etchant bath;

placing the wire in the etchant bath to a preselected depth for etching;

withdrawing the wire from the preselected depth at a controlled rate to form a differential etch to form a tapered wire with a desired tapered figure of the tapered monocapillary optic;

inverting the etched wire and subsequently placing the unetched section of the wire in the etchant bath;

withdrawing the wire at a controlled rate to form a second differential etch to form a taper having desired tapered figure in the opposite direction from the first etch;

coating the tapered wire with a coating reflective of the radiation to be focused by the monocapillary optic to produce a coated wire; and, removing the tapered wire from the reflective coating to leave only a reflective bore having the desired figure for focusing radiation.

4. A process for producing a tapered monocapillary optic used for focusing radiation having a figure tapering from a middle portion to both ends according to claim 3 and wherein:

the desired tapered figure on at least one end of the wire is an ellipsoidal figure.

5. A process for producing a tapered monocapillary optic used for focusing radiation having a figure tapering from a middle portion to both ends according to claim 3 and wherein:

the desired tapered figure on at least one end of the wire is a paraboloidal figure.

6. The product of the process of claim 1.

7. The product of the process of claim 6 having one or more slots therein.

8. The product of the process of claim 2.

9. The product of the process of claim 8 having one or more slots therein.

10. The product of the process of claim 8 having one or more slots therein.

11. The product of the process of claim 8 having one or more slots therein.

12. A tapered capillary optic comprising:

a first partial tapered capillary optic having a first end with a large opening, a second end with a small opening, and a tapered partial and expanding tapered figure therebetween;

a second partial tapered capillary optic having a first end with a large opening, a second end with a small opening, and a tapered partial and expanding tapered figure therebetween; and, the first partial tapered capillary optic at the first end being confronted to the second partial tapered capillary optic to form a tapered capillary optic for receiving radiation at one small opening and emitting radiation at the remaining small opening.

13. A tapered capillary optic according to claim 12 and further comprising:

at least one of the partial tapered capillary optics is an ellipsoidal figure.

14. A tapered capillary optic according to claim 12 and further comprising:

at least one of the partial tapered capillary optics is a paraboloidal figure.

15. The process of claim 1 and wherein the coating of the wire with a reflective coating includes coating the wire with a multilayer reflective coating.

16. The process of claim 2 and wherein the coating of the wire with a reflective coating includes coating the wire with a multilayer reflective coating.

17. The process of claim 3 and wherein the coating of the wire with a reflective coating includes coating the wire with a multilayer reflective coating.

18. A process for producing a tapered monocapillary optic having a tapered figure for focusing radiation comprising the steps of:

providing an etchant bath;

providing a wire to be etched by the etchant bath;

placing the wire in the etchant bath to a preselected depth for etching;

withdrawing the wire from the preselected depth at a controlled rate to form a differential etch to form a tapered wire with a desired figure of the tapered monocapillary optic;

coating the tapered wire with a coating reflective of the radiation to be focused by the monocapillary optic to produce a coated wire; and, plating the tapered wire to a rigid support;

removing the tapered wire from the reflective coating to leave only a reflective bore having the desired figure for focusing radiation on the rigid substrate.

* * * * *